US007063373B2

(12) United States Patent
Chikata et al.

(10) Patent No.: US 7,063,373 B2
(45) Date of Patent: Jun. 20, 2006

(54) DOOR-OPENING/CLOSING APPARATUS

(75) Inventors: Koji Chikata, Yamanashi (JP); Takuya Kakumae, Yamanashi (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 90 days.

(21) Appl. No.: 10/653,961

(22) Filed: Sep. 4, 2003

(65) Prior Publication Data

US 2004/0046418 A1 Mar. 11, 2004

(30) Foreign Application Priority Data

Sep. 6, 2002 (JP) ...................................... 2002-261916

(51) Int. Cl.
*B60J 5/00* (2006.01)

(52) U.S. Cl. ............................... 296/146.4; 296/176.8; 296/56; 192/56.42; 49/140; 74/625

(58) Field of Classification Search ............. 296/146.8, 296/146.4, 56, 106, 155; 192/18 B, 84.92, 192/56.42; 49/139, 140, 26, 340, 341; 74/625
See application file for complete search history.

(56) References Cited

U.S. PATENT DOCUMENTS 6,142,551 A * 11/2000 Ciavaglia et al. ............. 296/56
6,270,147 B1 * 8/2001 Butler et al. ............. 296/146.4
6,398,288 B1 * 6/2002 Yuge ....................... 296/146.4

FOREIGN PATENT DOCUMENTS

JP 2001-160959 A 6/2000
JP 2001-132327 A 5/2001

* cited by examiner

*Primary Examiner*—Joseph D. Pape
(74) *Attorney, Agent, or Firm*—Sughrue Mion, PLLC

(57) ABSTRACT

The clutch includes a drive disk, a follower disk and a brake disk. When current flows, the follower disk is connected with the drive disk to transmit a power from a driving unit to a door-opening/closing mechanism. When no current flows, the follower disk is separated from the drive disk to cut off the power transmission from the driving unit to the door-opening/closing mechanism. In a state that the drive disk and the follower disk are separated from each other, the brake disk is connected to the follower disk to brake the door-opening/closing mechanism in the opening direction of the door, and to allow the door-opening/closing mechanism to move in the closing direction of the door.

13 Claims, 7 Drawing Sheets

DOOR-OPENING/CLOSING APPARATUS

BACKGROUND OF THE INVENTION

1) Field of the Invention

The present invention relates to a door-opening/closing apparatus for a door of a vehicle.

2) Description of the Related Art

A conventional door-opening/closing apparatus includes a clutch that is placed between a door-opening/closing mechanism and a motor that drives the door-opening/closing mechanism. The clutch can arbitrarily select a completely connected state, an incompletely connected state and a completely separated state. According to the door-opening/closing apparatus, in the completely connected state, the clutch connects the motor and the door-opening/closing mechanism to transmit the rotation of the motor to the door-opening/closing mechanism, thereby opening and closing the door. In the completely separated state, the transmission of the rotation of the motor is cut off and the door can be manually opened and closed. In the incompletely connected state, the clutch is brought into a half clutch state to apply a braking force to the door, and the door can be closed by applying a force to the door. The conventional door-opening/closing apparatus has been disclosed in, for example, Japanese Patent Application Laid-open No. 2001-132327.

Although the door-opening/closing mechanism can be braked in the incompletely connected state and the door can be stopped in any position, since the braking force is obtained by bringing the clutch into the half clutch state, an electricity is always supplied to the clutch. For this reason, since the electricity must be supplied also when the door is braked at an arbitrary position, a battery may be exhausted in an extreme case.

SUMMARY OF THE INVENTION

It is an object of the present invention to solve at least the problems in the conventional technology.

The door-opening/closing apparatus for a vehicle according to the present invention includes a door-opening/closing mechanism that drives a door in a closing direction when the door is open, and a clutch having a first mechanism to flow an electric current and a second mechanism to any one of transmit and not transmit a power of a driving unit to the door-opening/closing mechanism based on whether the electric current is flowing in the first mechanism, wherein when the electric current flows in the first mechanism, the second mechanism transmits the power of the driving unit to the door-opening/closing mechanism so that the door can be any one of opened and closed, and when no electric current flows in the first mechanism, the second mechanism does not transmit the power of the driving unit to the door-opening/closing mechanism so that the door cannot be opened but can be closed.

The other objects, features and advantages of the present invention are specifically set forth in or will become apparent from the following detailed descriptions of the invention when read in conjunction with the accompanying drawings.

DETAILED DESCRIPTION

Exemplary embodiments of a door-opening/closing apparatus according to the present invention are explained in detail with reference to the accompanying drawings.

The door-opening/closing apparatus is mounted between a body of a vehicle and a door that closes an opening formed in the vehicle body, and the door-opening/closing apparatus opens and closes the door. For example, the door-opening/closing apparatus is applied to the door that closes an opening of a vehicle such as a tailgate, side gate and the like. The door-opening/closing apparatus applied to a door which closes an opening formed in a tailgate, i.e., a rear portion of the vehicle will be explained as one example. The door-opening/closing apparatus applied to the tailgate is not used independently, but is used together with a damper mounted between the vehicle body and the door, and a closer fully closes the door which was closed by the door-opening/closing apparatus. The damper supports a weight of the door in a state in which the door is opened, and has a function for opening and closing lightly the door. The closer has a function for fully closing the door which was closed by the door-opening/closing apparatus.

Figure 1:
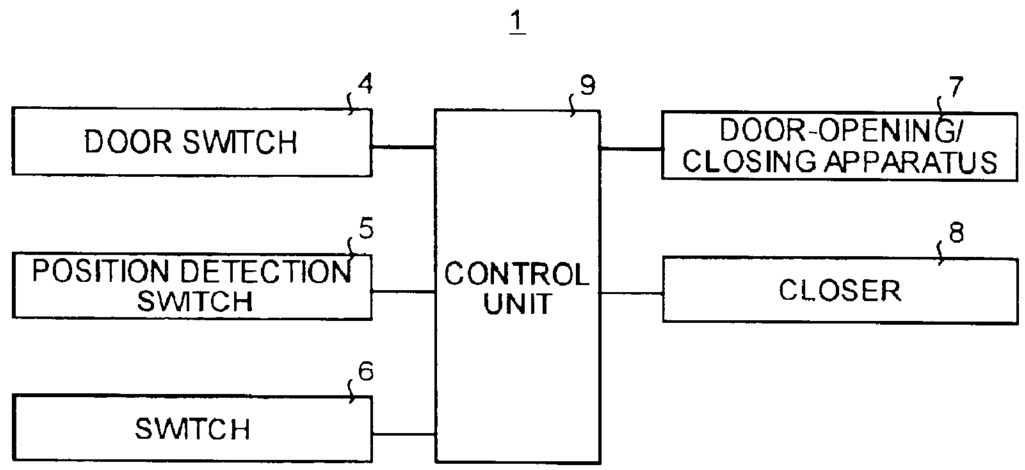
FIG. 1 is a block diagram of a door-opening/closing unit to which a door-opening/closing apparatus of a first embodiment of the present invention is applied.
Figure 2:
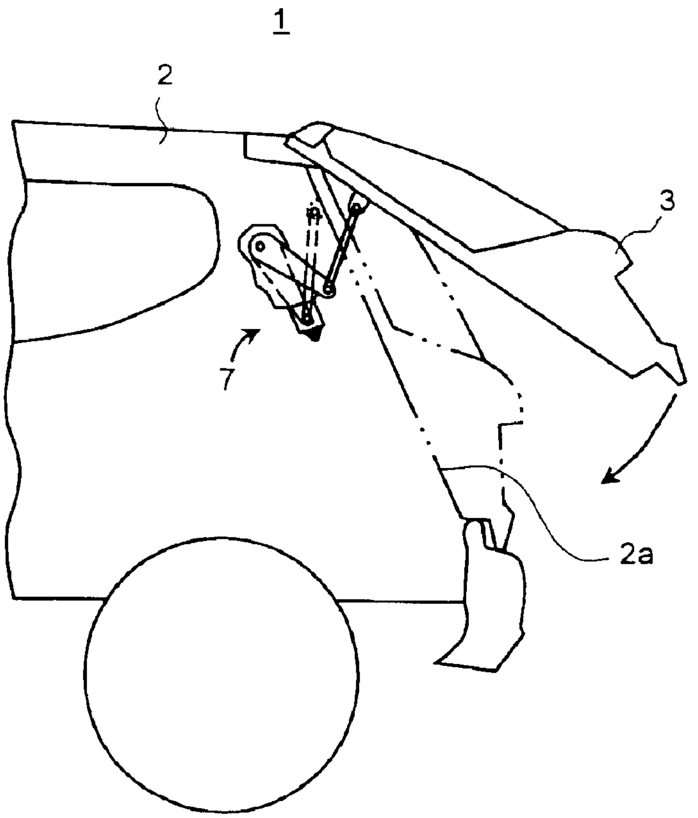
FIG. 2 is schematic diagram of the door-opening/closing apparatus shown in FIG. 1.
Figure 3:
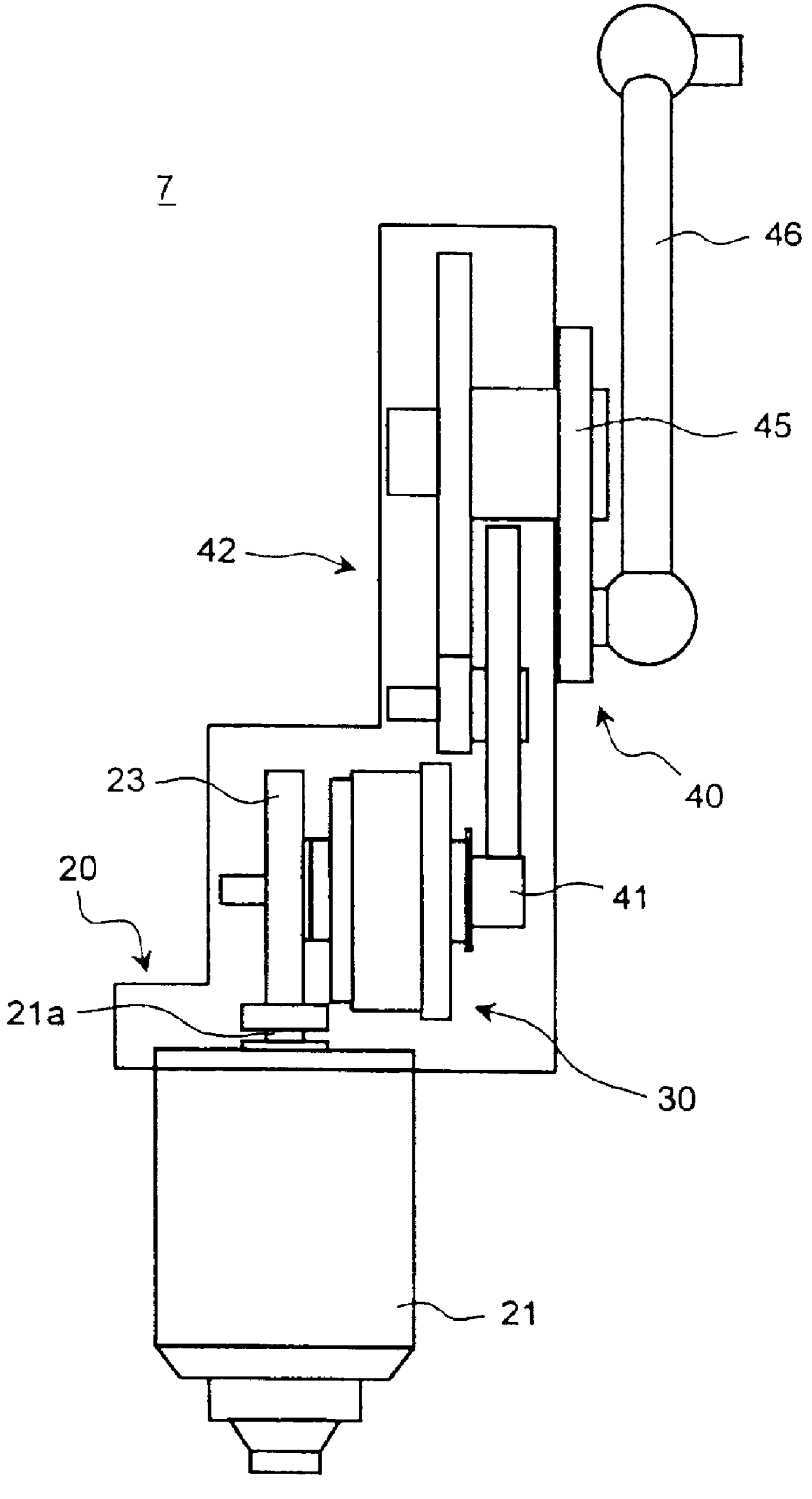
FIG. 3 is a front view of the door-opening/closing apparatus shown in FIG. 2.
Figure 4:
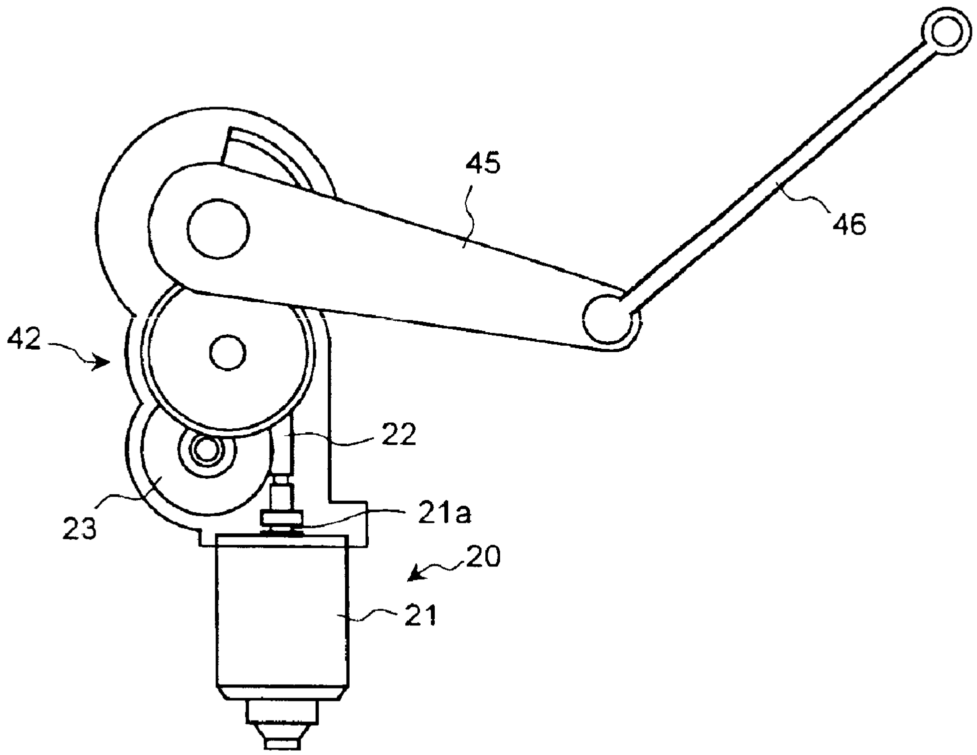
FIG. 4 is a side view of the door-opening/closing apparatus shown in FIG. 2.
Figure 5:
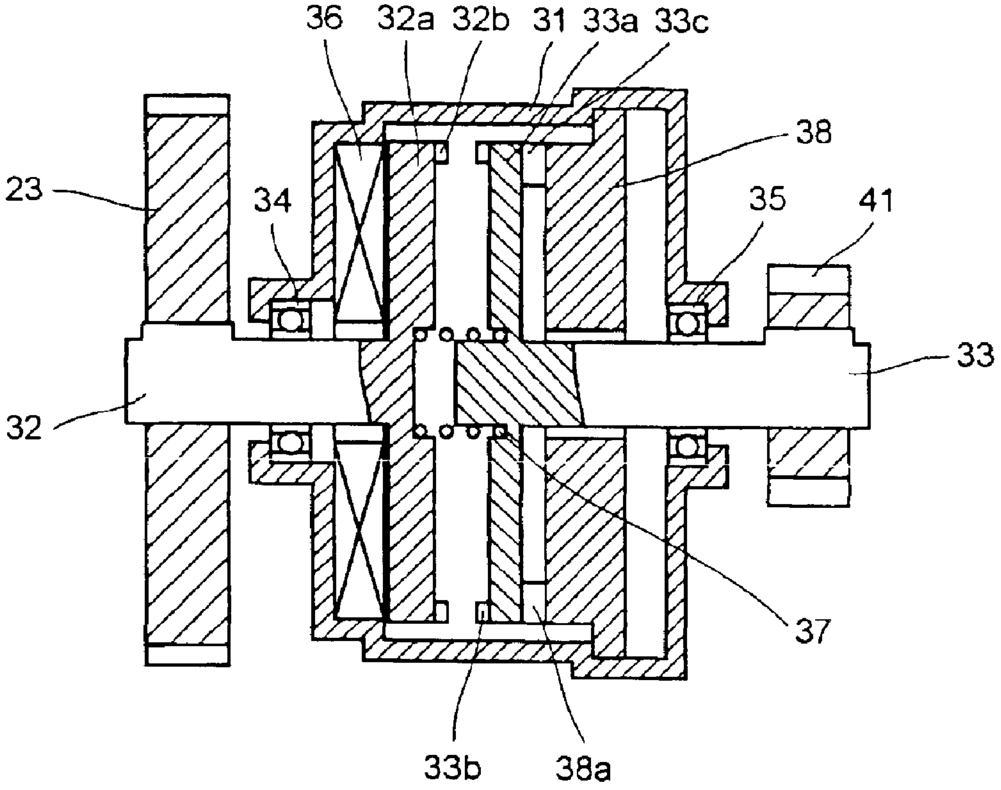
FIG. 5 is a vertical cross-section of a clutch shown in FIG. 3.
Figure 6A:
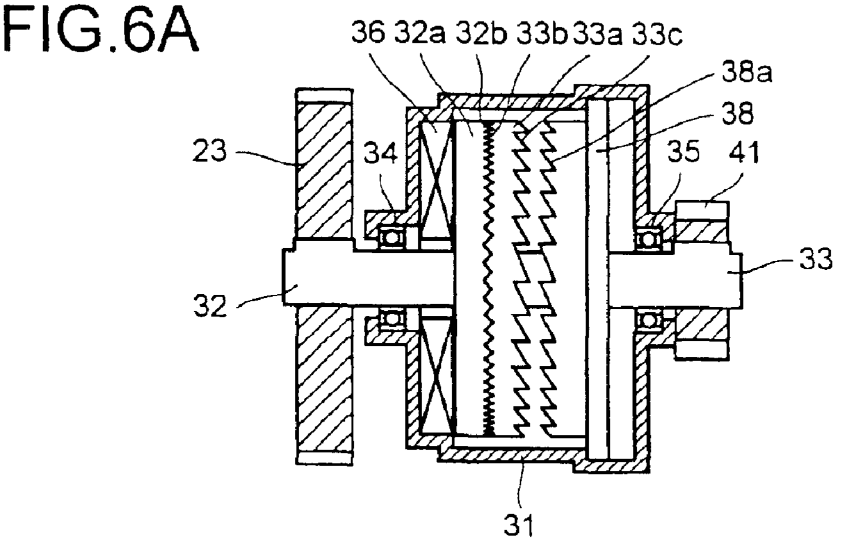
FIG. 6A is a cross-section of the clutch according to the first embodiment in a current-on state.
Figure 6B:
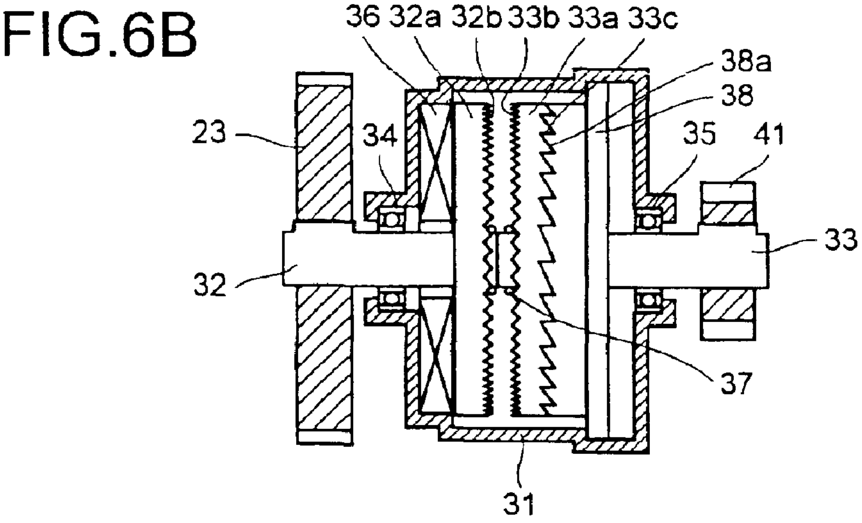
FIG. 6B is a cross-section of the clutch according to the first embodiment in a current-off state.
Figure 6C:
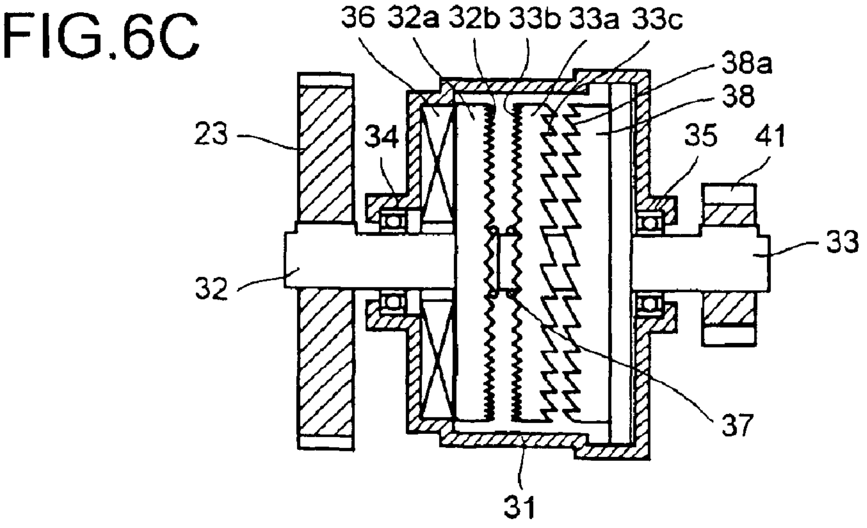
FIG. 6C is a cross-section of the clutch according to the first embodiment in a non-operative state.

FIG. 1 is a block diagram of a door-opening/closing unit to which a door-opening/closing apparatus of a first embodiment of the present invention is applied. FIG. 2 is schematic diagram of the door-opening/closing apparatus shown in FIG. 1. FIG. 3 is a front view of the door-opening/closing apparatus shown in FIG. 2. FIG. 4 is a side view of the door-opening/closing apparatus shown in FIG. 2. FIG. 5 is a vertical cross-section of a clutch shown in FIG. 3. FIG. 6A to FIG. 6C illustrates an operation of the clutch.

A door unit 1 for a vehicle comprises an opening 2*a* of a vehicle body 2, a door 3 which supports an upper portion of the opening 2*a* and closes the opening 2*a*, a door-opening/closing switch 4, a position detection switch 5 which detects a position of the door, a switch 6 which switches between an automatic opening/closing operation and a manual opening/closing operation of the door 3, a door-opening/closing apparatus 7, a closer 8 and a control device 9 which controls the above members.

The door-opening/closing switch 4 is a driver switch disposed in the vicinity of a driver's seat, an open handle switch disposed in the vicinity of an open handle, a keyless switch built in a vehicle key, or a gate switch disposed on an inner side of a tailgate. The door-opening/closing switch 4 switches between a closing command and an opening command depending upon a length of ON time of the switch. For example, when the door-opening/closing switch 4 is pressed once, this is interpreted as being the closing command of the door 3, and when the door-opening/closing switch 4 is pressed for a long time, this is interpreted as being the opening command of the door 3. An input from the open handle switch is interpreted as being the opening command of the door 3 irrespective of length of ON time of the switch. An input from the gate switch is interpreted as being the closing command of the door 3 irrespective of the length of ON time of the switch.

The position detection switch 5 detects a position of the door. For example, the position detection switch 5 detects the door position by means of a rotation angle of a shaft which supports the door 3. Like the gate switch, the switch 6 is disposed on an inner side of a tailgate and switches between an operative state and a non-operative state. The door-opening/closing apparatus 7 opens or closes the door 3 when the switch 6 is in its operative state. The closer 8 is for further closing the door 3 which was closed by the door-opening/closing apparatus 7, and brings the door 3 into the fully closed state.

A structure of the door-opening/closing apparatus 7 will be explained next. As shown in FIG. 2, the door-opening/closing apparatus 7 is mounted between the vehicle body 2 and the door 3, and is applied to the door 3 which closes the opening 2*a* of the vehicle body 2. The door-opening/closing apparatus 7 includes a driving unit 20, a door-opening/closing mechanism 40, and a clutch 30 interposed between the driving unit 20 and the door-opening/closing mechanism 40.

The driving unit 20 comprises a motor 21, a worm gear 22 mounted on an output shaft 21*a* of the motor 21, and a worm wheel 23 that is engaged with the worm gear 22.

As shown in FIG. 5, the clutch 30 includes a housing 31, and an input shaft 32 and an output shaft 33 which are rotatably supported by the housing 31. The input shaft 32 and the output shaft 33 are supported by the housing 31 in a coaxial manner.

The housing 31 is mounted on a bearing 34 which rotatably supports the input shaft 32, a bearing 35 which rotatably supports the output shaft 33, and an electromagnetic coil 36.

A worm wheel 23 is mounted on the input shaft 32 outside the housing 31. A driving disk 32*a* is integrally formed on the input shaft 32 inside the housing 31. Angle teeth 32*b* are formed on a surface of the driving disk 32*a* on the side of the output shaft 33.

A follower disk 33*a* opposed to the driving disk 32*a* is integrally formed on the output shaft 33 inside the housing 31. Angle teeth 33*b* that is engaged with the teeth 32*b* of the driving disk 32*a* are formed on a surface of the follower disk 33*a* opposed to the driving disk 32*a*. Saw teeth 33*c* are formed on a surface of the follower disk 33*a* which is opposite to the surface opposed to the driving disk 32*a*. The saw teeth 33*c* comprise tooth flanks intersecting with a circumferential direction at right angles, and tooth flanks having acute angle with respect to the circumferential direction for connecting the former tooth flanks with each other. A compression spring 37 which biases the follower disk 33*a* away from the driving disk 32*a* is inserted between the driving disk 32*a* and the follower disk 33*a*.

A brake disk 38 which is opposed to the follower disk 33*a* is mounted on the housing 31. Saw teeth 38*a* are formed on a surface of the brake disk 38 which is opposed to the follower disk 33*a*. The saw teeth 38*a* is engaged with the teeth 33*c* formed on the follower disk 33*a*. Like the teeth 33*c* formed on the follower disk 33*a*, the saw teeth 38*a* comprise tooth flanks intersecting with a circumferential direction at right angles, and tooth flanks having an acute angle with respect to the circumferential direction for connecting the former tooth flanks with each other. If the follower disk 33*a* and the brake disk 38 are coupled to each other, rotation of the follower disk 33*a* is prevented in a direction in which the surfaces of the teeth 33*c* of the follower disk 33*a* intersecting with the circumferential direction at right angles and tooth flanks of the teeth 38*a* of the brake disk 38 intersecting with the circumferential direction at right angles abut against each other, and rotation of the follower disk 33*a* is permitted in a direction in which the tooth flanks of the teeth 33*c* of the follower disk 33*a* intersecting with the circumferential direction at right angles, and tooth flanks of the teeth 38*a* of the brake disk 38 intersecting with the circumferential direction at right angles are separated away from each other.

The brake disk 38 can be switched between a connection-possible position where the brake disk 38 can be connected to the follower disk 33*a* and a connection-impossible position where the brake disk 38 cannot be connected to the follower disk 33*a*. That is, the brake disk 38 is slidably mounted on the housing 31, and the brake disk 38 is switched between the connection-possible position and the connection-impossible position. The brake disk 38 is switched between the connection-possible position and the connection-impossible position by sliding the brake disk 38. For example, a lever (not shown in the figure) is mounted on the brake disk 38, and the brake disk 38 is switched between the connection-possible position and the connection-impossible position by moving the lever. An actuator (not shown in the figure) such as a solenoid may be mounted on the housing 31 and the brake disk 38 may be switched from the connection-possible position to the connection-impossible position by retracting the brake disk 38 in by the actuator. The connection-possible position corresponds to the operative state of the switch 6, and the connection-impossible position corresponds to the non-operative state of the switch 6.

The door-opening/closing mechanism 40 comprises a gear 41 mounted on an output shaft of the clutch 30, a gear train 42 that is engaged with the gear 41, a rotation arm 45 coaxially mounted on an output shaft of the gear train 42, and a retractable arm 46 connected to the rotation arm 45.

Next, the operation of the door-opening/closing apparatus 7 according to the first embodiment will be explained based on FIG. 6A to FIG. 6C. Here, the switch 6 is in its operative state.

If the door-opening/closing switch 4 inputs the opening command of the door 3, electricity is supplied to the electromagnetic coil 36, and a current-carrying state is established. In the current-carrying state, as shown in FIG. 6A, the follower disk 33*a* is coupled to the driving disk 32*a* against a biasing force of the compression spring 37, and the follower disk 33*a* and the brake disk 38 are separated from each other. At that time, the teeth 32*b* of the driving disk 32*a* and the teeth 33*b* of the follower disk 33*a* are engaged with each other. Rotation of the motor 21 is transmitted to the door-opening/closing mechanism 40, and the door 3 is gradually opened. If the door opening-stop command is input during the opening operation of the door 3, the supply of electricity to the motor 21 and the electromagnetic coil 36 is stopped, and the non-current-carrying state is established. As a result, the door 3 is stopped at the halfway through the opening process. If an opening-stop signal is not input during the opening process of the door 3, the supply of electricity to the motor 21 and the electromagnetic coil 36 is stopped at the fully opened position of the door 3, and the non-current-carrying state is established.

When the door 3 is at the halfway through the opening process or at the fully opened position in the non-current-carrying state, as shown in FIG. 6B, the driving disk 32*a* and the follower disk 33*a* are separated from each other by the biasing force of the compression spring 37, and the follower disk 33*a* and the brake disk 38 are coupled to each other. At that time, since the teeth 33*c* of the follower disk 33*a* and the teeth 38*a* of the brake disk 38 are engaged with each other, the follower disk 33*a* cannot rotate. Since the teeth 33*b* of the follower disk 33*a* can climb over the teeth 38*a* of the brake disk 38 and rotate, the teeth 33*b* allow the follower disk 33*a* to rotate only in one direction (closing direction of the door 3). That is, the door 3 is stopped at any position, but if a force is applied to the door 3, the door 3 can be closed.

If a closing command of the door 3 is input from this state, electricity is supplied to the electromagnetic coil 36, and the current-carrying state is established. In the current-carrying state, as shown in FIG. 6A, the follower disk 33*a* is coupled to the driving disk 32*a* against the biasing force of the compression spring 37, and the follower disk 33*a* and the brake disk 38 are separated from each other. At that time, the teeth 32*b* of the driving disk 32*a* and the teeth 33*b* of the follower disk 33*a* are engaged with each other. The rotation of the motor 21 is transmitted to the door-opening/closing mechanism 40 to gradually close the door 3. If the closing-stop command is input during the closing process of the door 3, the electricity supply to the motor 21 and the electromagnetic coil 36 is stopped, and the non-current-carrying state is established. As a result, the door 3 is stopped at the halfway through the closing operation. If the closing-stop command of the door 3 is not input at the halfway through the closing operation of the door 3, the electricity supplied to the motor 21 and the electromagnetic coil 36 is stopped, and the non-current-carrying state is established.

If the door 3 is at the halfway through the closing operation in the non-current-carrying state, as shown in FIG. 6B, the driving disk 32*a* and the follower disk 33*a* are separated from each other by the biasing force of the compression spring 37 like the case in which the door 3 is at the halfway through the opening operation or at the fully opened position, and the follower disk 33*a* and the brake disk 38 are coupled to each other. At that time, since the teeth 33*c* of the follower disk 33*a* and the teeth 38*a* of the brake disk 38 are engaged with each other, the follower disk 33*a* cannot rotate. Since the teeth 33*b* of the follower disk 33*a* can climb over the teeth 38*a* of the brake disk 38 and rotate, the follower disk 33*a* is allowed to rotate only in one direction (closing direction of the door 3). That is, in this case, although the door 3 stops at any position, if a force is applied to the door 3, the door 3 can be closed.

When the switch 6 is in its non-operative state, the supply of electricity to the motor 21 and the electromagnetic coil 36 is cut off. Since the switch 6 is in its non-operative state as shown in FIG. 6C, the brake disk 38 is in the connection-impossible position, the drive disk 32*a* and the follower disk 33*a* are separated from each other, and the follower disk 33*a* and the brake disk 38 are separated from each other. Therefore, the follower disk 33*a* can freely rotate and thus, the door 3 can freely be opened and closed. Further, since the motor 21 is prohibited from rotating, the drive disk 32*a* does not idle.

The door-opening/closing apparatus 7 according to the first embodiment of the present invention is not limited only to the door 3 which closes the tailgate, and the door-opening/closing apparatus 7 can also be applied to a slide door which closes a side gate.

As explained above, according to the door-opening/closing apparatus 7 of the first embodiment, when the switch 6 is in the operative state, the drive disk 32*a* and the follower disk 33*a* are connected with each other when the electromagnetic coil 36 is energized. Therefore, the rotation of the motor 21 can be transmitted to the door-opening/closing mechanism 40 to open and close the door 3. When the electromagnetic coil 36 is not energized, the follower disk 33*a* and the drive disk 32*a* are separated from each other and the follower disk 33*a* is connected to the brake disk 38. Therefore, the door-opening/closing mechanism 40 is braked in the opening direction of the door 3, and the door-opening/closing mechanism 40 is allowed to move in the closing direction of the door 3. Therefore, it is possible to stop the door 3 at any position and to close the door 3 at any time. Therefore, even when the motor 21 is out of order or a battery is exhausted, the door 3 can be closed.

Since it is possible to connect the follower disk 33*a* and the brake disk 38 with each other and to brake the follower disk 33*a* in the non-current-carrying state, the door 3 can be stopped at any position without supplying electricity.

When the switch 6 is in the non-operative state, since the follower disk 33*a* and the brake disk 38 are separated from each other, the door 3 can be freely opened and closed.

Figure 7:
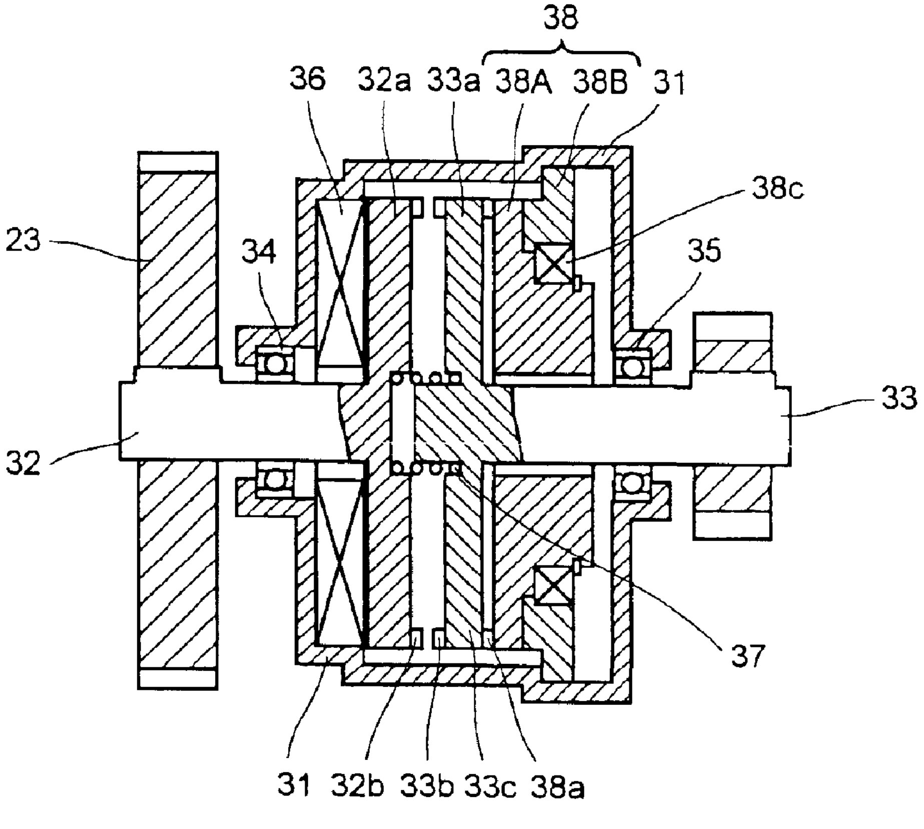
FIG. 7 is a vertical cross-section of a clutch of door-opening/closing apparatus according to a second embodiment of the present invention.
Figure 8A:
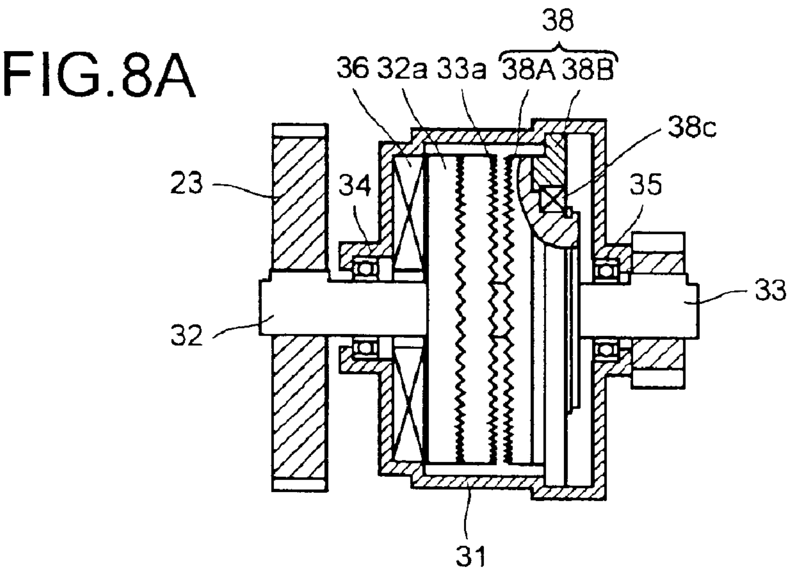
FIG. 8A is a cross-section of the clutch according to the second embodiment in a current-on state.
Figure 8B:
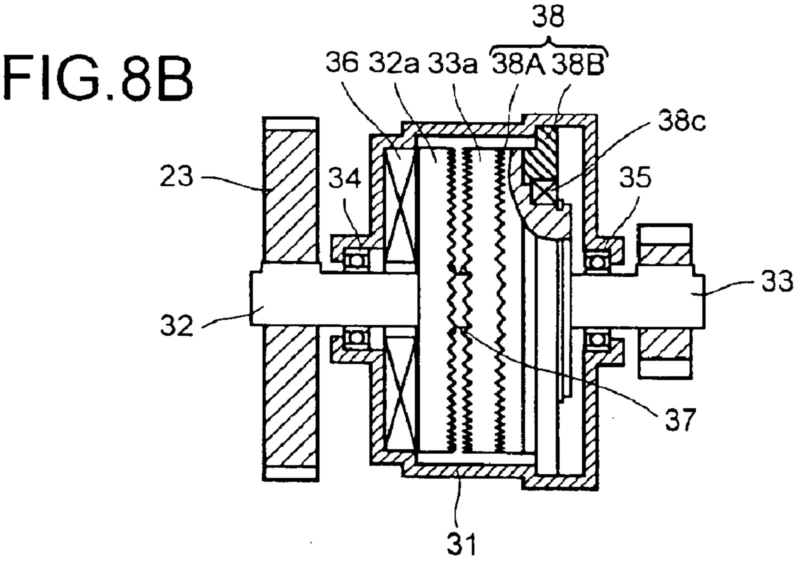
FIG. 8B is a cross-section of the clutch according to the second embodiment in a current-off state.
Figure 8C:
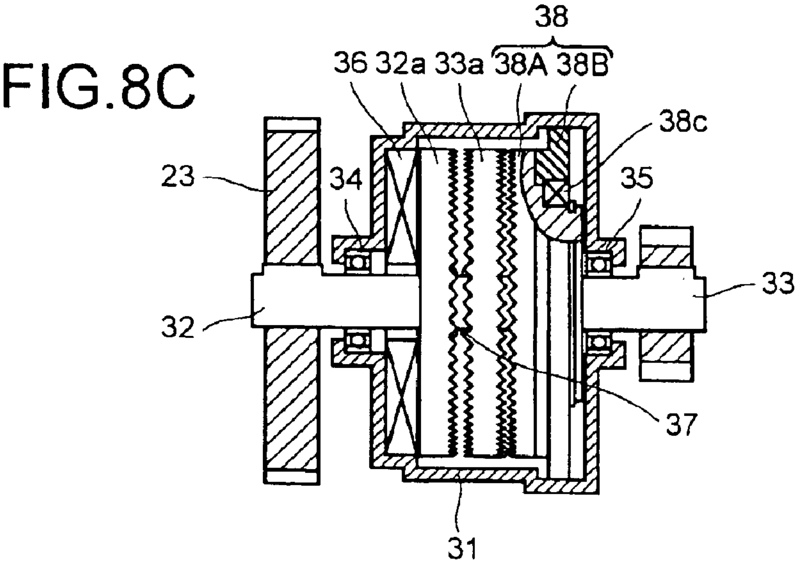
FIG. 8C is a cross-section of the clutch according to the second embodiment in a non-operative state.

FIG. 7 is a vertical cross-section of a clutch of a door-opening/closing apparatus according to a second embodiment of the present invention. FIG. 8A to FIG. 8C illustrates an operation of the clutch.

Like the clutch of the door-opening/closing apparatus of the first embodiment, the clutch of the door-opening/closing apparatus of the second embodiment comprises a housing, an input shaft rotatably supported by a housing, and an output shaft which transmits a rotation of the input shaft in the current-carrying state and cuts off the transmission of the rotation of the input shaft in the non-current-carrying state. Since the housing and the input shaft are the same as those of the clutch of door-opening/closing apparatus of the first embodiment, they are designated with the same symbols and explanation thereof is omitted.

The clutch of the door-opening/closing apparatus according to the second embodiment is different from that of the first embodiment in that a one-way clutch 38C which permits a rotation only in one direction is embedded in the brake disk 38. That is, the brake disk 38 is divided into an inner race 38A and an outer race 38B, and the one-way clutch 38C is interposed therebetween. The inner race 38A is formed with teeth 38*a* that is engaged with teeth 33*c* formed on the follower disk 33*a* so that the follower disk 33*a* and the inner race 38A can be connected with each other and thus, the teeth need not be the saw tooth in shape, and the teeth may be the angle-teeth as shown in FIG. 7.

The operation of the door-opening/closing apparatus of the second embodiment will be explained based on FIG. 8A to FIG. 8C. When the switch 6 is in the operative state, if the door-opening/closing switch 4 inputs the opening command of the door 3, electricity is supplied to the electromagnetic coil 36, and a current-carrying state is established. In the current-carrying state, as shown in FIG. 8A, the follower disk 33*a* is coupled to the driving disk 32*a* against a biasing force of the compression spring 37, and the follower disk 33*a* and the inner race 38A are separated from each other. At that time, the teeth 32*b* of the driving disk 32*a* and the teeth 33*b* of the follower disk 33*a* are engaged with each other. Rotation of the motor 21 is transmitted to the door-opening/closing mechanism 40, and the door 3 is gradually opened. If the door opening-stop command is input during the opening operation of the door 3, the supply of electricity to the motor 21 and the electromagnetic coil 36 is stopped, and the non-current-carrying state is established. As a result, the door 3 is stopped at the halfway through the opening process. If an opening-stop signal is not input during the opening process of the door 3, the supply of electricity to the motor 21 and the electromagnetic coil 36 is stopped at the fully opened position of the door 3, and the non-current-carrying state is established.

When the door 3 is at the halfway through the opening process or at the fully opened position in the non-current-carrying state, as shown in FIG. 8B, the driving disk 32*a* and the follower disk 33*a* are separated from each other by the biasing force of the compression spring 37, and the follower disk 33*a* and the inner race 38A are coupled to each other. At that time, since the teeth 33*c* of the follower disk 33*a* and the teeth 38*a* of the inner race 38A are engaged with each other, and the follower disk 33*a* and the inner race 38A are allowed to rotate only in one direction (closing direction of the door 3). That is, the door 3 is stopped at any position, but if a force is applied to the door 3, the door 3 can be closed.

If a closing command of the door 3 is input in this state, electricity is supplied to the electromagnetic coil 36, and the current-carrying state is established. In the current-carrying state, as shown in FIG. 8A, the follower disk 33*a* is coupled to the driving disk 32*a* against the biasing force of the compression spring 37, and the follower disk 33*a* and the inner race 38A are separated from each other. At that time, the teeth 32*b* of the driving disk 32*a* and the teeth 33*b* of the follower disk 33*a* are engaged with each other. The rotation of the motor 21 is transmitted to the door-opening/closing mechanism 40 to gradually close the door 3. If the closing-stop command is input during the closing process of the door 3, the electricity supply to the motor 21 and the electromagnetic coil 36 is stopped, and the non-current-carrying state is established. As a result, the door 3 is stopped at the halfway through the closing operation. If the closing-stop command of the door 3 is not input at the halfway through the closing operation of the door 3, the electricity supplied to the motor 21 and the electromagnetic coil 36 is stopped, and the non-current-carrying state is established.

If the door 3 is at the halfway through the closing operation in the non-current-carrying state, as shown in FIG. 8B, the driving disk 32*a* and the follower disk 33*a* are separated from each other by the biasing force of the compression spring 37 when the door 3 is at halfway through the opening operation or at the fully opened position, and the follower disk 33*a* and the inner race 38A are coupled to each other. At that time, the teeth 33*c* of the follower disk 33*a* and the teeth 38*a* of the inner race 38A are engaged with each other, the follower disk 33*a* and the inner race 38A are allowed to rotate only in one direction (closing direction of the door 3). That is, in this case, although the door 3 stops at any position, if a force is applied to the door 3, the door 3 can be closed.

When the switch 6 is in the non-operative state, the electricity supply to the motor 21 and the electromagnetic coil 36 is cut off. Since the switch 6 is in its non-operative state, as shown in FIG. 8C, the brake disk 38 is in the connection-impossible position, the drive disk 32*a* and the follower disk 33*a* are separated from each other, and the follower disk 33*a* and the brake disk 38 are separated from each other. Therefore, the follower disk 33*a* can freely rotate and thus, the door 3 can freely be opened and closed. Further, since the motor 21 is prohibited from rotating, the drive disk 32*a* does not idle.

The door-opening/closing apparatus according to the second embodiment of the present invention is not limited only to the door 3 which closes the tailgate, and the door-opening/closing apparatus 7 can also be applied to a slide door which closes a side gate.

As explained above, according to the door-opening/closing apparatus of the second embodiment, when the switch 6 is in the operative state, the drive disk 32*a* and the follower disk 33*a* are connected with each other when the electromagnetic coil 36 is energized. Therefore, the rotation of the motor 21 can be transmitted to the door-opening/closing mechanism to open and close the door 3. When the electromagnetic coil 36 is not energized, the follower disk 33*a* and the drive disk 32*a* are separated from each other and the follower disk 33*a* is connected to the inner race 38A. Therefore, the door-opening/closing mechanism is braked in the opening direction of the door 3, and the door-opening/closing mechanism is allowed to move in the closing direction of the door 3. Therefore, it is possible to stop the door 3 at any position and to close the door 3 any time. Therefore, even when the motor 21 is out of order or a battery is exhausted, the door 3 can be closed.

Since it is possible to connect the follower disk 33*a* and the inner race 38A with each other and to brake the follower disk 33*a* in the non-current-carrying state, the door 3 can be closed at any position without supplying electricity.

When the switch 6 is in the non-operative state, since the follower disk 33*a* and the inner race 38A are separated from each other, the door 3 can be freely opened and closed.

Further, the brake disk 38 is divided into the inner race 38A and the outer race 38B, and the one-way clutch 38C which allows rotation only in one direction is interposed between the races. Therefore, unlike the clutch of the door-opening/closing apparatus of the first embodiment, no noise is generated when the teeth of the follower disk climb over the teeth of the brake disk.

As explained above, according to the door-opening/closing apparatus of the present invention, since the braking unit brakes the door-opening/closing mechanism in the door-opening direction in the non-current-carrying state, the opening operation of the door can be stopped in any position. Since the braking unit allows an operation of the door-opening/closing mechanism in the door-closing direction in the non-current-carrying state, the door can be stopped at any time. Therefore, even when the driving unit is out of order or a battery goes flat, the door can be closed.

Moreover, since the apparatus can be switched between the operative state and the non-operative state, it is possible to stop the door in an arbitrary opening position in the operative state, and to freely open and close the door in the non-operative state.

Furthermore, in a state in which the drive disk and the follower disk are separated from each other, since the follower disk is connected to the brake disk and brakes the door-opening/closing mechanism in the opening direction of the door, the door can be stopped at any position. In a state in which the drive disk and the follower disk are separated from each other, the brake disk allows the follower disk to move in the closing direction of the door and thus, the door can be stopped at any time. Therefore, even when the driving unit is out of order or a battery goes flat, the door can be closed.

Moreover, in a state in which the drive disk and the follower disk are separated from each other, if the brake disk is separated from the follower disk, since the brake disk allows the door-opening/closing mechanism to move in the opening direction of the door, the door can be freely opened and closed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A door-opening/closing apparatus for a vehicle, the vehicle having a body, the body having an opening, the vehicle having a door for closing the opening of the body based on a power of a driving unit, comprising:

a door-opening/closing mechanism that drives the door in at least one of an opening and closing direction; and a clutch having a first mechanism to flow an electric current and a second mechanism to any one of transmit and not transmit the power of the driving unit to the door-opening/closing mechanism based on whether the electric current is flowing in the first mechanism, wherein when the electric current flows in the first mechanism, the second mechanism transmits the power of the driving unit to the door-opening/closing mechanism so that the door can be any one of opened and closed, and when no electric current flows in the first mechanism, the second mechanism does not transmit the power of the driving unit to the door-opening/closing mechanism so that the door cannot be opened but can be closed.

2. The door-opening/closing apparatus according to claim 1, wherein the clutch has a third mechanism to switch between a first state and a second state, wherein, in the first state, the door-opening/closing mechanism is disabled to allow of the door, and in the second state, the door-opening/closing mechanism allows opening and closing of the door.

3. The door-opening/closing apparatus according to claim 1, wherein the second mechanism includes:

a drive disk that is driven by the driving unit;

a follower disk that is linked with the door-opening/closing mechanism, wherein when the electric current flows in the first mechanism, the follower disk is engaged with the drive disk to transmit the power of the driving unit to the door-opening/closing mechanism, and when no electric current flows in the first mechanism, the follower disk is separated from the drive disk to cut off the transmission of the power; and a brake disk that is engaged with the follower disk when no electric current flows in the first mechanism, wherein the brake disk disables the door-opening/closing mechanism to allow opening of the door, and the brake disk allows the door-opening/closing mechanism to allow closing of the door.

4. The door-opening/closing apparatus according to claim 3, wherein the drive disk and the follower disk have angled teeth, operable to engage with each other, and when the electric current flows in the first mechanism, the teeth of the drive disk and the follower disk are engaged with each other, and when no electric current flows in the first mechanism, the teeth of the drive disk and the follower disk are separated from each other.

5. The door-opening/closing apparatus according to claim 3, wherein the follower disk and the brake disk have saw teeth, wherein each of the saw teeth of the brake disk has a first surface that is perpendicular to a plane of the follower disk and a second surface that makes a slope with respect to the plane of the follower disk, and when no electric current flows in the first mechanism, the follower disk cannot rotate in a descending direction of the slope of the second surface of the brake disk, the door-opening/closing mechanism is disabled to drive the door in the opening direction of the door, the follower disk is allowed to rotate in an ascending direction of the slope of the second surface of the saw teeth of the brake disk, and the door-opening/closing mechanism allows closing of the door.

6. The door-opening/closing apparatus according to claim 3, wherein the brake disk includes an inner race and an outer race; and a one-way clutch that is placed between the inner race and the outer race, the one-way clutch being configured to disable the power transmission in the opening direction of the door, and to allow the power transmission in the closing direction of the door.

7. The door-opening/closing apparatus according to claim 3, wherein the brake disk is configured to be separable from the follower disk when the drive disk and the follower disk are separated from each other.

8. The door-opening/closing apparatus according to claim 2, wherein the clutch includes:

a drive disk that is driven by the driving unit;

a follower disk that is linked with the door-opening/closing mechanism, wherein when the electric current flows in the first mechanism, the follower disk is engaged with the drive disk to transmit the power of the driving unit to the door-opening/closing mechanism, and when no electric current flows in the first mechanism, the follower disk is separated from the drive disk to cut off the transmission of the power; and a brake disk that is engaged with the follower disk when no electric current flows in the first mechanism, wherein the brake disk disables the door-opening/closing mechanism to allow opening of the door, and the brake disk allows the door-opening/closing mechanism to allow closing of the door.

9. The door-opening/closing apparatus according to claim 8, wherein the drive disk and the follower disk have angled teeth, operable to engage with each other, when the electric current flows in the first mechanism, the teeth of the drive disk and the follower disk are engaged with each other, and when no electric current flows in the first mechanism, the teeth of the drive disk and the follower disk are separated from each other.

10. The door-opening/closing apparatus according to claim 8, wherein the follower disk and the brake disk have saw teeth, wherein each of the saw teeth of the brake disk has a first surface that is perpendicular to a plane of the follower disk and a second surface that makes a slope with respect to the plane of the follower disk, and when no electric current flows in the first mechanism, the follower disk cannot rotate in a descending direction of the slope of the second surface of the saw teeth of the brake disk, the door-opening/closing mechanism is disabled to drive the door in the opening direction of the door, the follower disk is allowed to rotate in an ascending direction of the slope of the second surface of the saw teeth of the brake disk, and the door-opening/closing mechanism allows is of the door.

11. The door-opening/closing apparatus according to claim 8, wherein the brake disk includes an inner race and an outer race; and a one-way clutch that is placed between the inner race and the outer race, the one way clutch being configured to disable the power transmission in the opening direction of the door, and to allow the power transmission in the closing direction of the door.

12. The door-opening/closing apparatus according to claim 8, wherein the brake disk is configured to be separable from the follower disk when the drive disk and the follower disk are separated from each other.

13. The door-opening/closing apparatus according to claim 1, wherein the door is a back door that closes a tailgate formed on a rear portion of the body.

* * * * *